United States Patent
Liu

(10) Patent No.: US 11,516,832 B2
(45) Date of Patent: Nov. 29, 2022

(54) METHOD AND DEVICE FOR TRANSMITTING DATA IN UNLICENSED CELL, BASE STATION AND USER EQUIPMENT

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 108 days.

(21) Appl. No.: 17/046,471

(22) PCT Filed: Apr. 11, 2018

(86) PCT No.: PCT/CN2018/082711
§ 371 (c)(1),
(2) Date: Oct. 9, 2020

(87) PCT Pub. No.: WO2019/196034
PCT Pub. Date: Oct. 17, 2019

(65) Prior Publication Data
US 2021/0176777 A1    Jun. 10, 2021

(51) Int. Cl.
*H04W 74/08* (2009.01)
*H04W 72/12* (2009.01)
*H04L 1/08* (2006.01)

(52) U.S. Cl.
CPC .......... *H04W 72/1273* (2013.01); *H04L 1/08* (2013.01); *H04W 74/0808* (2013.01)

(58) Field of Classification Search
None
See application file for complete search history.

(56) References Cited

U.S. PATENT DOCUMENTS 10,959,254 B2 * 3/2021 Xu ........................... H04L 5/001
11,191,099 B2 * 11/2021 Li ........................... H04L 1/1812
(Continued)

FOREIGN PATENT DOCUMENTS

CN         102055571 A     5/2011
CN         102158971 A     8/2011
(Continued)

OTHER PUBLICATIONS

LG Electronics Inc.,"SL SPS configuration and UE assistant information", 3GPP TSG-RAN WG2 #95, R2-165693, Gothenburg, Sweden, Aug. 22-26, 2016, 6 pages.
(Continued)

*Primary Examiner* — Ajit Patel
(74) *Attorney, Agent, or Firm* — Finnegan, Henderson, Farabow, Garrett & Dunner, L.L.P.

(57) ABSTRACT

A method for transmitting data in an unlicensed cell includes: performing Listen before Talk (LBT) detection on a current channel; if it is detected that the current channel is idle, transmitting first downlink data to user equipment (UE) using a current minimum scheduling resource; and if feedback information indicating that the UE successfully receives the first downlink data is received, increasing the scheduling resource until the scheduling resource reaches a preset size, and transmitting second downlink data to the UE using the scheduling resource of the preset size, wherein the preset size refers to a maximum size of the scheduling resource that can be used when data is transmitted through the current channel.

18 Claims, 10 Drawing Sheets

(56) References Cited

U.S. PATENT DOCUMENTS

| | | | |
|---|---|---|---|
| 2010/0113058 A1 | 5/2010 | Wu | |
| 2013/0028243 A1 | 1/2013 | Wentink et al. | |
| 2015/0257144 A1 | 9/2015 | Hooli et al. | |
| 2015/0341921 A1* | 11/2015 | Chen | H04W 74/004 370/330 |
| 2017/0150367 A1* | 5/2017 | Han | H04L 5/0092 |
| 2018/0014284 A1 | 1/2018 | Yi et al. | |
| 2018/0103460 A1 | 4/2018 | Sharma et al. | |
| 2018/0352564 A1* | 12/2018 | Ye | H04L 5/0044 |
| 2018/0359772 A1* | 12/2018 | Park | H04W 16/14 |
| 2019/0320462 A1* | 10/2019 | Li | H04W 74/0808 |
| 2020/0228991 A1* | 7/2020 | Jiang | H04W 72/042 |
| 2021/0360431 A1* | 11/2021 | Li | H04W 16/14 |

FOREIGN PATENT DOCUMENTS

| | | |
|---|---|---|
| CN | 106250061 A | 12/2016 |
| CN | 106304350 A | 1/2017 |
| CN | 106465391 A | 2/2017 |
| CN | 107197522 A | 9/2017 |
| CN | 107210871 A | 9/2017 |
| CN | 107295643 A | 10/2017 |
| CN | 107371274 A | 11/2017 |
| CN | 107666711 A | 2/2018 |
| CN | 107734543 A | 2/2018 |
| CN | 107734560 A | 2/2018 |
| CN | 107852716 A | 3/2018 |
| CN | 108702777 A | 10/2018 |
| EP | 2 566 093 A1 | 3/2013 |
| WO | WO 2017/079284 A1 | 5/2017 |
| WO | WO 2017/196086 A1 | 11/2017 |
| WO | WO 2018/032000 A1 | 2/2018 |

OTHER PUBLICATIONS

LG Electronics Inc.,"UL SPS configuration and UE assistant information", 3GPP TSG-RAN WG2 #95, R2-165696, Gothenburg, Sweden, Aug. 22-26, 2016, 5 pages.

State Intellectual Property Office of the People's Republic of China, Office Action and Search Report Issued in Application No. 201880000649.X, dated Mar. 16, 2021, 14 pages.

ISA State Intellectual Property Office of the People's Republic of China, Written Opinion of the International Searching Authority Issued in Application No. PCT/CN2018/082711, dated Dec. 26, 2018, WIPO, 9 pages.

ISA State Intellectual Property Office of the People's Republic of China, Written Opinion of the International Searching Authority Issued in Application No. PCT/CN2018/084498, dated Jan. 23, 2019, WIPO, 9 pages.

ISA State Intellectual Property Office of the People's Republic of China, Written Opinion of the International Searching Authority Issued in Application No. PCT/CN2018/085487, dated Dec. 10, 2018, WIPO, 8 pages.

Intel Corporation, On Sensing Design Details for Sidelink V2V Communication, 3GPP TSG RAN WG1 Meeting #84bis, R1-162363, Busan, Korea, Apr. 11-15, 2016, 10 pages.

State Intellectual Property Office of the People's Republic of China, First Office Action and Search Report Issued in Application No. 201880000612.7, dated Nov. 27, 2020, 19 pages.

State Intellectual Property Office of the People's Republic of China, Second Office Action and Search Report Issued in Application No. 201880000612.7, dated Jun. 1, 2021, 23 pages.

State Intellectual Property Office of the People's Republic of China, First Office Action and Search Report Issued in Application No. 201880000623.5, dated Jan. 15, 2021, 10 pages.

ISA State Intellectual Property Office of the People's Republic of China, International Search Report Issued in Application No. PCT/CN2018/082711, dated Dec. 26, 2018, WIPO, 4 pages.

ISA State Intellectual Property Office of the People's Republic of China, International Search Report Issued in Application No. PCT/CN2018/084498, dated Jan. 23, 2019, WIPO, 4 pages.

ISA State Intellectual Property Office of the People's Republic of China, International Search Report Issued in Application No. PCT/CN2018/085487, dated Dec. 10, 2018, WIPO, 4 pages.

Xiaomi, UE behaviour when direction confliction between ULGF and dynamic SFI, 3GPP TSG RAN WG1 Meeting #92, Athens, Greece, R1-1802530, Feb. 26-Mar. 2, 2018, 4 pages.

Ericsson, RRC reconfiguration of SPS-Config, 3GPP TSG-RAN WG2 RAN2#101, Athens, Greece, Tdoc R2-1803537, Feb. 26 to Mar. 2, 2018, 3 pages.

* cited by examiner

METHOD AND DEVICE FOR TRANSMITTING DATA IN UNLICENSED CELL, BASE STATION AND USER EQUIPMENT

CROSS REFERENCE TO RELATED APPLICATIONS

This application is a national phase application based on International Application No. PCT/CN2018/082711, filed Apr. 11, 2018, the content of which is incorporated herein by reference.

TECHNICAL FIELD

The present disclosure relates to the technical field of communication, and in particular to a method and a device for transmitting data in an unlicensed cell, a base station, user equipment, and a computer-readable storage medium.

BACKGROUND

With the rapid development of wireless communication technology, the fifth generation of mobile communication technology (5th Generation, 5G) has emerged. The 3rd Generation Partnership Project (3GPP) has recently conducted research on the 5G New Radio Unlicensed Spectrum (NR-U). The design of unlicensed spectrum must first take into consideration related regulations in various regions of the world. For example, Listen before Talk (LBT), that is, energy detection must be performed before transmitting a signal. If there is another device transmitting a signal on this channel, waiting is necessary. On the basis of Long Term Evolution (LTE) Licensed Assisted Access (LAA), 5G also has some special designs, such as 5G mostly being applied in higher frequency bands, and data exchanged between systems and terminals being usually sent in a form of beams, so new requirements are put forward for LBT and data transmission methods.

For a beam system, a transmitting base station may detect that a channel is idle during LBT, and meanwhile an interfering base station or terminal may also be transmitting signals, but the beam direction of the signals may not be facing the transmitting base station. Therefore, the transmission base station, by mistake, believes that there is no interference. When the transmission base station transmits a signal, the beam direction turns to the direction of the base station, causing data transmission failure and triggering retransmission. Due to the larger bandwidth of the 5G unlicensed system, the retransmitted data is larger, which will waste channel resources and cause greater delay.

In the related art, a probe signal is introduced between the LBT and the data transmission to reduce the data retransmission caused by interference and collision. After 1-to-n times of probe with the probe signal, if the probe is successful, data transmission is continued. However, the probe signal will inevitably cause delay in data transmission.

SUMMARY

In view of the above, the present application provides a method and a device for transmitting data in an unlicensed cell, a base station, user equipment, and a computer-readable storage medium, in order to reduce delay in data transmission.

According to a first aspect of embodiments of the present disclosure, a method for transmitting data in an unlicensed cell is provided, which is applied to a base station, and the method includes:

performing Listen before Talk (LBT) detection on a current channel;

if it is detected that the current channel is idle, transmitting first downlink data to user equipment (UE) using a current minimum scheduling resource; and if feedback information indicating the UE successfully receives the first downlink data is received, increasing the scheduling resource until the scheduling resource reaches a preset size, and transmitting second downlink data to the UE using scheduling resource of the preset size, wherein the preset size refers to a maximum size of the scheduling resource that can be used when data is transmitted through the current channel.

In an embodiment, increasing the scheduling resource until the scheduling resource reaches a preset size and transmitting second downlink data to the UE using scheduling resource of the preset size includes:

increasing the scheduling resource and recording a total number of times of increasing the scheduling resource;

deciding whether the current scheduling resource reaches a preset size;

if the current scheduling resource does not reach the preset size, transmitting third downlink data to the UE using the current scheduling resource; and if the current scheduling resource reaches the preset size, transmitting the second downlink data to the UE using the scheduling resource of the preset size.

In an embodiment, the method further includes:

before transmitting the second downlink data to the UE using the scheduling resource of the preset size, if a request for a scheduling resource for uplink data is received from the UE, setting a conversion time interval between the uplink data and downlink data, wherein the conversion time interval is related to the total number of times of increasing the scheduling resource and is less than a preset value;

determining a transmission time instant for the uplink data according to the conversion time interval and a transmission time instant for the current downlink data; and transmitting the transmission time instant for the uplink data to the UE.

In an embodiment, the method further includes:

transmitting scheduling information to the UE, wherein the scheduling information is used to indicate that the base station transmits downlink data in an ascending order of data size and indicate a size of downlink data transmitted each time, and the downlink data includes first downlink data, second downlink data and third downlink data.

In an embodiment, the method further includes:

performing LBT detection on the current channel if feedback information indicating the UE has failed to receive the third downlink data is received, and retransmitting the third downlink data when the current channel is idle.

In an embodiment, the method further includes:

performing LBT detection on the current channel if feedback information indicating the UE has failed to receive the first downlink data is received, and retransmitting the first downlink data when the current channel is idle.

In an embodiment, a time length of the LBT detection gradually increases with increase of the number of LBT detections, the maximum time length of the LBT detection is less than or equal to a preset time length, and the preset time length refers to a time length normally used by the base station for LBT detection in data transmission.

According to a second aspect of embodiments of the present disclosure, a method for transmitting data in an unlicensed cell is provided, which is applied to UE, and the method includes:

receiving scheduling information transmitted by a base station;

determining, according to the scheduling information, that the base station transmits downlink data in an ascending order of data size, and a size of downlink data transmitted each time; and enabling a buffer area of a corresponding size according to the size of the downlink data currently to be received.

In an embodiment, if the downlink data currently to be received is first downlink data, the enabled buffer area is a first buffer area, and a size of the first buffer area is smaller than a preset threshold;

if the downlink data currently to be received is second downlink data, the enabled buffer area is a second buffer area, and a size of the second buffer area is equal to the preset threshold; or if the downlink data currently to be received is third downlink data, the enabled buffer area is a second buffer area, a size of the third buffer area is smaller than the preset threshold and the third buffer area is larger than the first buffer area.

In an embodiment, the method further includes:

requesting a scheduling resource for uplink data to the base station, and the scheduling resource includes a transmission time instant;

receiving the transmission time instant for the uplink data transmitted by the base station; and transmitting the uplink data to the base station at the transmission time instant.

According to a third aspect of embodiments of the present disclosure, a device for transmitting data in an unlicensed cell is provided, which is applied to a base station, and the device includes:

a detection module configured to perform Listen before Talk (LBT) detection on a current channel;

a first transmission module configured to, when the detection module detects that the current channel is idle, transmit first downlink data to user equipment (UE) using a current minimum scheduling resource; and a second transmission module configured to, when receiving feedback information indicating that the UE successfully receives the first downlink data transmitted by the first transmission module, increase the scheduling resource until the scheduling resource reaches a preset size, and transmit second downlink data to the UE using scheduling resource of the preset size, wherein the preset size refers to a maximum size of the scheduling resource that can be used when data is transmitted through the current channel.

In an embodiment, the second transmission module includes:

an increasing-recording submodule configured to increase the scheduling resource and record a total number of times of increasing the scheduling resource;

a deciding submodule configured to decide whether the current scheduling resource increased by the increasing-recording submodule reaches a preset size;

a first transmission submodule configured to, when the deciding submodule decides that the current scheduling resource does not reach the preset size, transmit third downlink data to the UE using the current scheduling resource; and when receiving the feedback information indicating the UE successfully receives the third downlink data, invoke the increasing-recording submodule to continue to perform the operation of increasing the scheduling resource; and a second transmission submodule configured to, when the deciding submodule decides that the current scheduling resource reaches the preset size, transmit the second downlink data to the UE using the scheduling resource of the preset size.

In an embodiment, the device further includes:

a setting module configured to, before the second transmission submodule transmits the second downlink data to the UE using the scheduling resource of the preset size, set a conversion time interval between the uplink data and downlink data when receiving a request for a scheduling resource for uplink data from the UE, wherein the conversion time interval is related to the total number of times of increasing the scheduling resource and is less than a preset value;

a determining module configured to determine a transmission time instant for the uplink data according to the conversion time interval set by the setting module and a transmission time instant for the current downlink data; and a third transmission module configured to transmit the transmission time instant for the uplink data determined by the determining module to the UE.

In an embodiment, the device further includes:

a fourth transmission module configured to transmit scheduling information to the UE, wherein the scheduling information is used to indicate that the base station transmits downlink data in an ascending order of data size and indicate a size of downlink data transmitted each time, and the downlink data includes first downlink data, second downlink data and third downlink data.

In an embodiment, the device further includes:

a first detection-retransmission module configured to perform LBT detection on the current channel when receiving feedback information indicating the UE has failed to receive the third downlink data, and retransmit the third downlink data when the current channel is idle.

In an embodiment, the device further includes:

a second detection-retransmission module configured to perform LBT detection on the current channel when receiving feedback information indicating the UE has failed to receive the first downlink data, and retransmit the first downlink data when the current channel is idle.

In an embodiment, a time length of the LBT detection gradually increases with increase of the number of LBT detections, the maximum time length of the LBT detection is less than or equal to a preset time length, and the preset time length refers to a time length normally used by the base station for LBT detection in data transmission.

According to a fourth aspect of embodiments of the present disclosure, a device for transmitting data in an unlicensed cell is provided, which is applied to UE, and the device includes:

a first receiving module configured to receive scheduling information transmitted by a base station;

a determining module configured to determine, according to the scheduling information received by the first receiving module, that the base station transmits downlink data in an ascending order of data size and a size of downlink data transmitted each time; and an enabling module is configured to enable a buffer area of a corresponding size according to the size of the downlink data currently to be received which is determined by the determining module.

In an embodiment, if the downlink data currently to be received is first downlink data, the enabled buffer area is a first buffer area, and a size of the first buffer area is smaller than a preset threshold;

if the downlink data currently to be received is second downlink data, the enabled buffer area is a second buffer area, and a size of the second buffer area is equal to the preset threshold; or if the downlink data currently to be received is third downlink data, the enabled buffer area is a second buffer area, a size of the third buffer area is smaller than the preset threshold and the third buffer area is larger than the first buffer area.

In an embodiment, the device further includes:

a request module configured to request a scheduling resource for uplink data to the base station, and the scheduling resource includes a transmission time instant;

a second receiving module configured to receive the transmission time instant for the uplink data transmitted by the base station according to the scheduling resource requested by the request module; and a data transmission module configured to transmit the uplink data to the base station at the transmission time instant received by the second receiving module.

According to a fifth aspect of embodiments of the present disclosure, a base station is provided, including:

a processor; and a memory for storing processor-executable instructions;

wherein the processor is configured to:

perform Listen before Talk (LBT) detection on a current channel;

if it is detected that the current channel is idle, transmit first downlink data to user equipment (UE) using a current minimum scheduling resource; and if feedback information indicating the UE successfully receives the first downlink data is received, increase the scheduling resource until the scheduling resource reaches a preset size, and transmit second downlink data to the UE using scheduling resource of the preset size, wherein the preset size refers to a maximum size of the scheduling resource that can be used when data is transmitted through the current channel.

According to a sixth aspect of embodiments of the present disclosure, user equipment is provided, including:

a processor; and a memory for storing processor executable instructions;

wherein the processor is configured to:

receive scheduling information transmitted by a base station;

determine, according to the scheduling information, that the base station transmits downlink data in an ascending order of data size, and a size of downlink data transmitted each time; and enable a buffer area of a corresponding size according to the size of the downlink data currently to be received.

According to a seventh aspect of embodiments of the present disclosure, a computer-readable storage medium having computer instructions stored thereon is provided, wherein, when the instructions are executed by a processor, the steps of the method for transmitting data in an unlicensed cell described above are performed.

According to an eighth aspect of embodiments of the present disclosure, a computer-readable storage medium having computer instructions stored thereon is provided, wherein, when the instructions are executed by a processor, the steps of the method for transmitting data in an unlicensed cell described above are performed.

The technical solutions provided by the embodiments of the present disclosure can include the following beneficial effects.

When it is detected that the current channel is idle, the current minimum scheduling resource is used to transmit the first downlink data to the UE. If the feedback information indicating the UE successfully receives the first downlink data is received, the scheduling resource is increased, until reaching the preset size, and the scheduling resource of the preset size is used to transmit the second downlink data to the UE. That is, in the above embodiment, a smaller amount of downlink data is transmitted first, and then after the smaller amount of downlink data is successfully transmitted, a larger amount of downlink data is transmitted. Thus, when the beam direction of the interfering node is facing the base station, the amount of retransmitted data can be reduced, thereby reducing the delay in data transmission.

By receiving the scheduling information transmitted by the base station, it can be determined, according to the scheduling information, that the base station transmits downlink data in an ascending order of data size, and the size of downlink data transmitted each time. According to the size of downlink data currently to be received, a buffer area of the corresponding size is enabled, so as to achieve the objective of reducing the buffer overhead.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
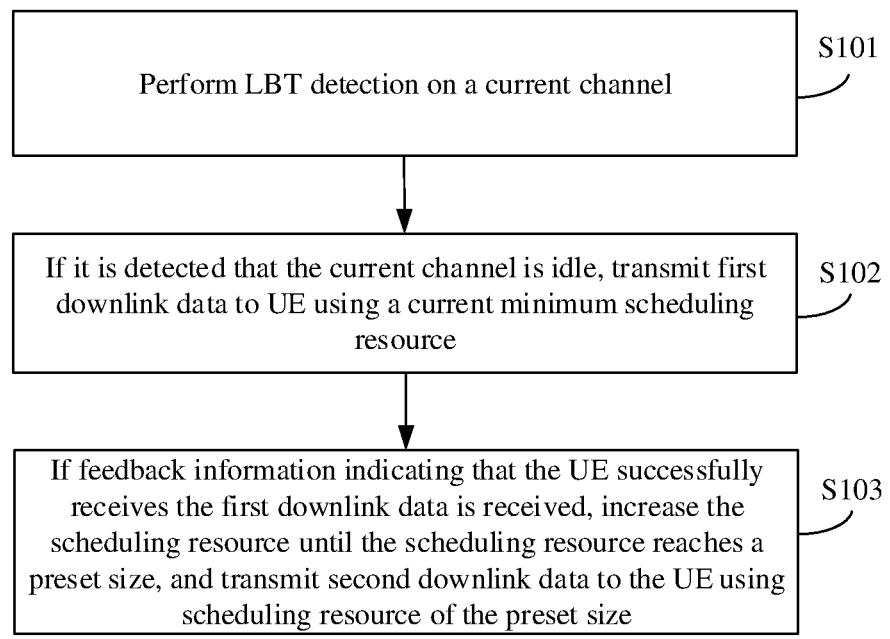
FIG. 1 is a flowchart illustrating a method for transmitting data in an unlicensed cell according to an example of the present application.

Examples will be described in detail herein, with the illustrations thereof represented in the drawings. When the following descriptions involve the drawings, like numerals in different drawings refer to like or similar elements unless otherwise indicated. The examples described in the following examples do not represent all examples consistent with the present disclosure. Rather, they are merely examples of apparatuses and methods consistent with some aspects of the present disclosure as detailed in the appended claims.

For a beam system, a transmitting base station may detect that the channel is idle during LBT, and meanwhile an interfering node such as a base station may also be transmitting signals, but the beam direction may not be facing the transmitting base station. Therefore, if the base station transmits too much data at a time, and at the moment of transmission, the beam direction of the interfering node is facing the transmitting base station, the interference will be very large, resulting in a long delay in data transmission. The inventor realized this problem and proposed a technical solution of gradually increasing the amount of downlink data transmission. In this way, even if hidden nodes are exposed, the impact on data transmission can be small, that is, the delay in data transmission can be reduced.

FIG. 1 is a flowchart illustrating a method for transmitting data in an unlicensed cell according to an example of the present application, where the unlicensed cell refers to a cell on an unlicensed frequency band, and currently wireless fidelity (WiFi) and LTE LAA uses unlicensed frequency bands, and the use of unlicensed frequency bands at home and abroad does not require a license. This embodiment is described from the base station side. As shown in FIG. 1, the method for transmitting data in an unlicensed cell includes steps S101-S103.

At step S101, LBT detection is performed on a current channel.

At step S102, if it is detected that the current channel is idle, first downlink data is transmitted to UE using a current minimum scheduling resource.

In this embodiment, the base station first performs LBT detection before transmitting downlink data. If the base station detects that the current channel is idle, the base station transmits the first downlink data to the UE using a current minimum scheduling resource. The current minimum scheduling resource refers to the minimum possible subcarrier spacing (SCS) and the minimum time unit that is currently available, for example, one symbol.

At step S103, if feedback information indicating the UE successfully receives the first downlink data is received, the scheduling resource is increased until reaching a preset size, and second downlink data is transmitted to the UE using the scheduling resource of the preset size, where the preset size refers to a maximum size of the scheduling resource that can be used when data is transmitted through the current channel.

If the feedback information indicating the UE successfully receives the first downlink data is received, it indicates that the current channel is still idle. Therefore, the scheduling resources can be increased, and the increased scheduling resources can be used to continue transmitting downlink data. If the current channel is always idle, the scheduling resources can be increased until reaching the maximum size of the scheduling resource that can be used when the current channel is used to transmit data, and the maximum size of the scheduling resource can be used to transmit downlink data. If feedback information indicating the UE has failed to receive the first downlink data is received, the LBT detection is performed on the current channel again, and the first downlink data is retransmitted when the current channel is idle.

It should be noted that the time length of LBT detection gradually increases as the number of times of LBT detection increases, but the maximum time length of LBT detection is less than or equal to a preset time length which is a time length normally used by the base station for LBT detection in data transmission. For example, the time length of the first LBT detection is shorter than the time length of the second LBT detection, the time length of the second LBT detection is shorter than the time length of the third LBT detection, and so on, but the time length of the last LBT detection is less than or equal to the preset time length.

In the above embodiment, when it is detected that the current channel is idle, the current minimum scheduling resource is used to transmit the first downlink data to the UE. If the feedback information indicating the UE successfully receives the first downlink data is received, the scheduling resource is increased, until reaching the preset size, and the scheduling resource of the preset size is used to transmit the second downlink data to the UE. That is, in the above embodiment, a smaller amount of downlink data is transmitted first, and then after the smaller amount of downlink data is successfully transmitted, a larger amount of downlink data is transmitted. Thus, when the beam direction of the interfering node is facing the base station, the amount of retransmitted data can be reduced, thereby reducing the delay in data transmission.

Figure 2:
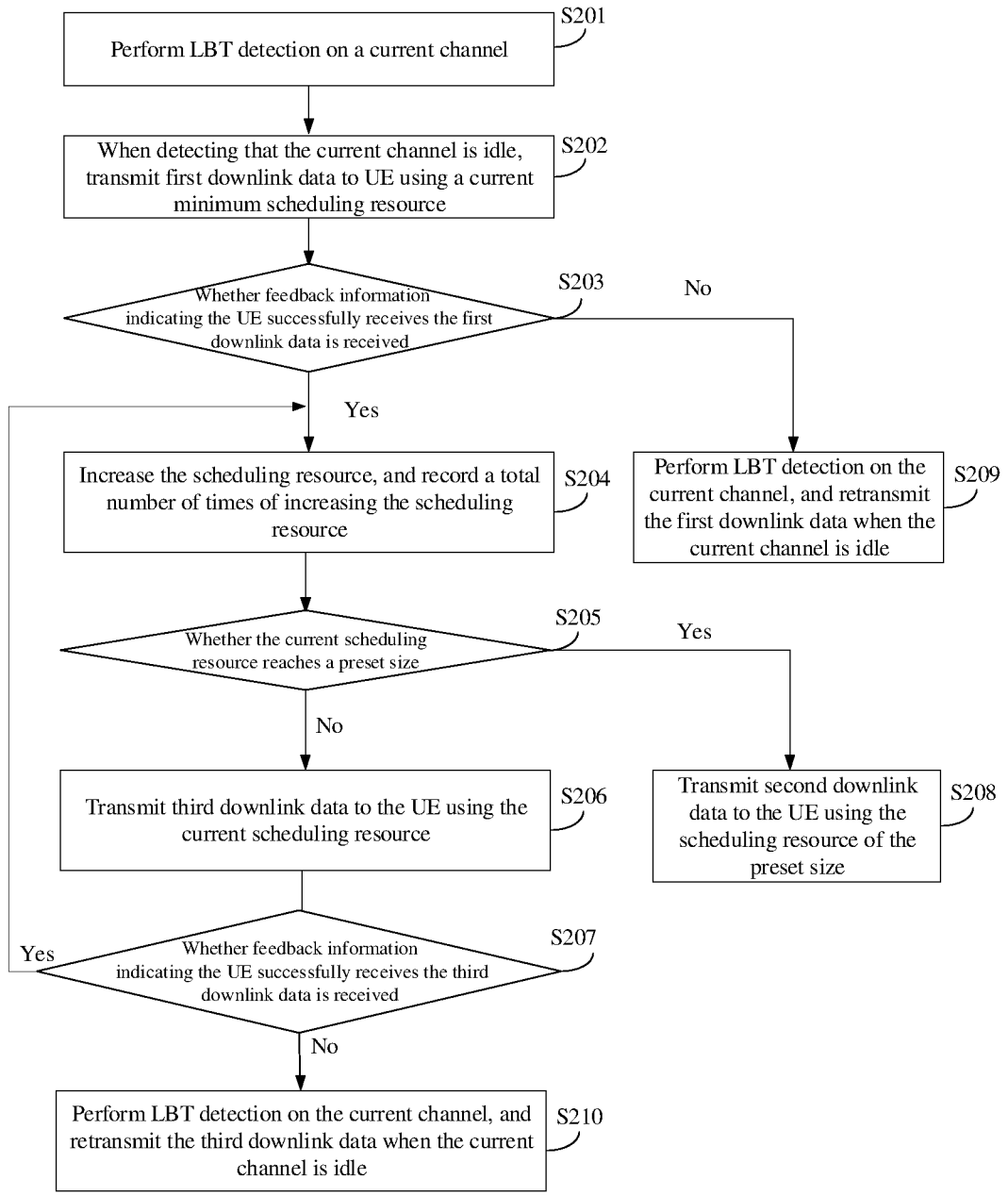
FIG. 2 is a flowchart illustrating another method for transmitting data in an unlicensed cell according to an example of the present application.

FIG. 2 is a flowchart illustrating another method for transmitting data in an unlicensed cell according to an example of the present application. As shown in FIG. 2, the method for transmitting data in an unlicensed cell includes steps S201-S210.

At step S201, LBT detection is performed on a current channel.

At step S202, when it is detected that the current channel is idle, first downlink data is transmitted to UE using a current minimum scheduling resource.

At step S203, it is decided whether feedback information indicating the UE successfully receives the first downlink data is received, if the feedback information indicating the UE successfully receives the first downlink data is received, then step S204 is performed. When feedback information indicating the UE successfully receives the first downlink data is not received, step S209 is performed.

At step S204, the scheduling resource is increased, and a total number of times of increasing the scheduling resource is recorded.

At step S205, it is decided whether the current scheduling resource reaches a preset size, if it does not reach the preset size, step S206 is performed, and if the preset size is reached, step S208 is performed.

At step S206, third downlink data is transmitted to the UE using the current scheduling resource.

At step S207, it is decided whether feedback information indicating the UE successfully receives the third downlink data is received. If the feedback information indicating the UE successfully receives the third downlink data is received, proceed to step S204, if feedback information indicating the UE successfully receives the third downlink data is not received, step S210 is performed.

At step S208, second downlink data is transmitted to the UE using the scheduling resource of the preset size, and the procedure ends.

At step S209, LBT detection is performed on the current channel, and the first downlink data is retransmitted when the current channel is idle, and the procedure ends.

If the transmission of the first downlink data fails, it is necessary to perform LBT detection on the current channel again, and retransmit the first downlink data when the current channel is idle.

At step S210, LBT detection is performed on the current channel, the third downlink data is retransmitted when the current channel is idle, and the procedure ends.

If transmitting the third downlink data fails, it is necessary to perform LBT detection on the current channel again, and retransmit the third downlink data when the current channel is idle.

In this embodiment, the time length of LBT detection gradually increases as the number of times of LBT detection increases, but the maximum time length of LBT detection is less than or equal to a preset time length which is a time length normally used by the base station for LBT detection in data transmission. For example, the time length of the first LBT detection is shorter than the time length of the second LBT detection, the time length of the second LBT detection is shorter than the time length of the third LBT detection, and so on, but the time length of the last LBT detection is shorter than or equal to the preset time length.

In the above embodiment, by gradually increasing the scheduling resources, the objective of gradually increasing the amount of data transmitted can be achieved. Thus, when the beam direction of the interfering node is facing the base station, the amount of retransmitted data can be reduced, thereby reducing the delay in data transmission.

Figure 3:
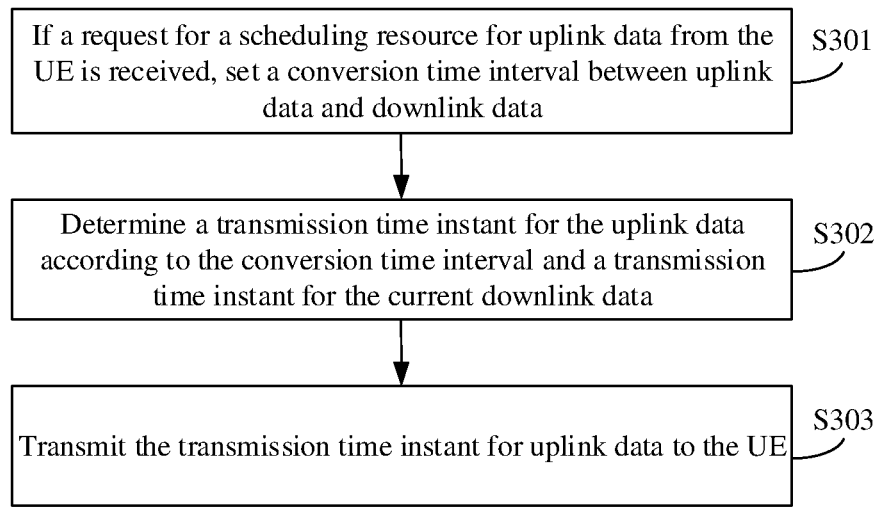
FIG. 3 is a flowchart illustrating another method for transmitting data in an unlicensed cell according to an example of the present application.

FIG. 3 is a flowchart illustrating another method for transmitting data in an unlicensed cell according to an example of the present application. As shown in FIG. 3, before step S208, the method for transmitting data in an unlicensed cell can also include steps S301-step S303.

At step S301, if a request for a scheduling resource for uplink data from the UE is received, a conversion time interval between uplink data and downlink data is set, where the conversion time interval is related to the total number of times of increasing the scheduling resource and is less than a preset value.

Before the base station normally transmits downlink data, the conversion time interval between uplink and downlink data is not required to be continuous, but it is required to be less than a preset value, for example, 16 us. The specific conversion time interval t depends on the algorithm of the base station, and is related to the total number n of times of increasing the scheduling resource, for example, t=T/n, where T is 16 us at most.

At step S302, a transmission time instant for the uplink data is determined according to the conversion time interval and a transmission time instant for the current downlink data.

After setting the conversion time interval, the transmission time instant for the uplink data can be determined according to the conversion time interval and the transmission time instant for the current downlink data.

At step S303, the transmission time instant for uplink data is transmitted to the UE.

In the above embodiment, by setting the conversion time interval between the uplink data and the downlink data, and according to the conversion time interval and the transmission time instant for the current downlink data, the transmission time instant for the uplink data can be determined, so that the UE can transmit the uplink data to the base station at the transmission time instant for the uplink data.

Figure 4:
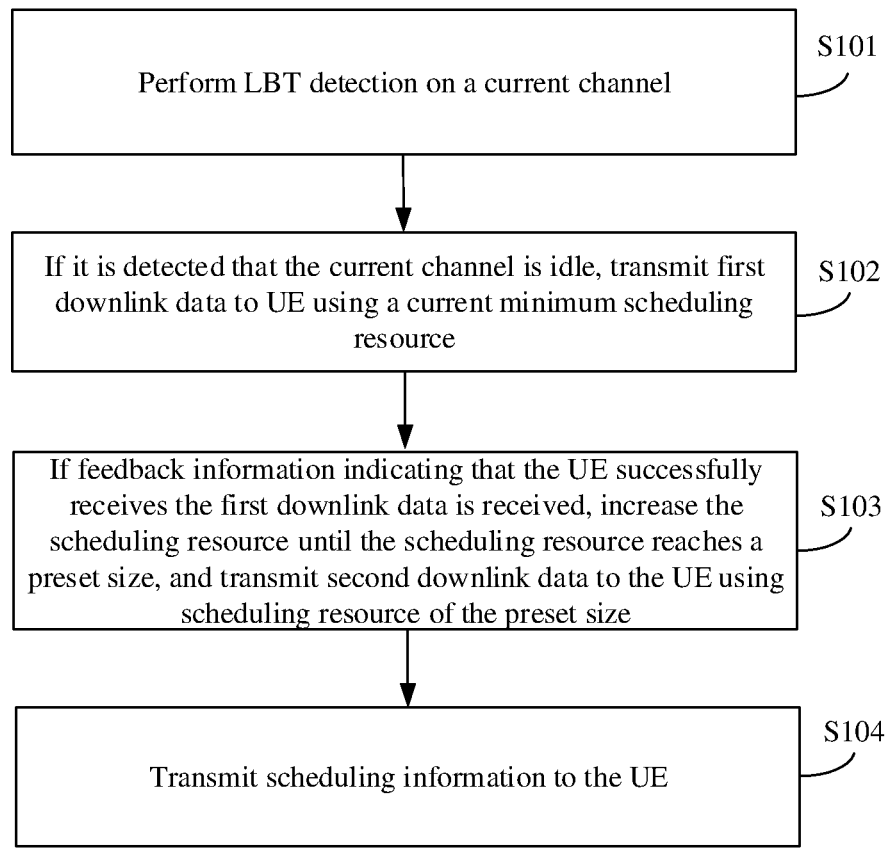
FIG. 4 is a flowchart illustrating another method for transmitting data in an unlicensed cell according to an example of the present application.

FIG. 4 is a flowchart illustrating another method for transmitting data in an unlicensed cell according to an example of the present application. As shown in FIG. 4, after the above step S103, the method for transmitting data in the unlicensed cell can also include step S104.

At step S104, scheduling information is transmitted to the UE. The scheduling information is used to indicate that the base station transmits downlink data in an ascending order of data size and indicate the size of the downlink data transmitted each time. The downlink data includes the first downlink data, the second downlink data and the third downlink data.

In this embodiment, after determining the size of the downlink data to be transmitted each time, the base station transmits scheduling information to the UE to inform the UE that the base station transmits the downlink data in an ascending order of data size and inform the size of the downlink data transmitted each time. This allows the UE to enable a buffer area of a corresponding size according to the size of the downlink data to be transmitted.

In the above embodiment, by transmitting scheduling information to the UE, the UE can enable a buffer area of a corresponding size according to the size of the downlink data to be transmitted, thereby achieving the objective of reducing buffering overhead.

Figure 5:
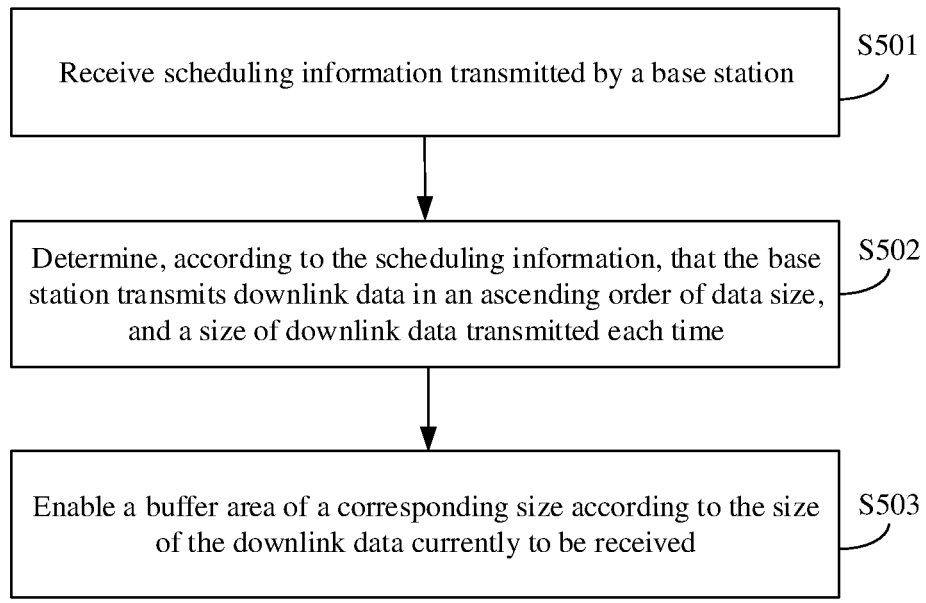
FIG. 5 is a flowchart illustrating yet another method for transmitting data in an unlicensed cell according to an example of the present application.

FIG. 5 is a flowchart illustrating yet another method for transmitting data in an unlicensed cell according to an example of the present application. This embodiment is described from the UE side. As shown in FIG. 5, the method for transmitting data in an unlicensed cell includes steps S501-S503.

At step S501, scheduling information transmitted by the base station is received.

At step S502, it is determined, according to the scheduling information, that the base station transmits downlink data in an ascending order of data size, and a size of downlink data transmitted each time.

At step S503, according to the size of the downlink data currently to be received, a buffer area of a corresponding size is enabled.

If the downlink data currently to be received is the first downlink data, the enabled buffer area is a first buffer area, and the size of the first buffer area is less than the preset threshold. If the downlink data currently to be received is the second downlink data, the enabled buffer area is the second buffer area, and the size of the second buffer area is equal to the preset threshold. If the downlink data currently to be received is the third downlink data, the enabled buffer area is the third buffer area, the size of the third buffer area is smaller than the preset threshold, and the third buffer area is larger than the first buffer area.

In the above embodiment, the scheduling information transmitted by the base station is received, and according to the scheduling information, it can be determined that the base station transmits downlink data in an ascending order of data size and the size of downlink data transmitted each time can be determined. According to the size of downlink data currently to be received, the buffer area of the corresponding size is enabled, so as to achieve the objective of reducing the buffer overhead.

Figure 6:
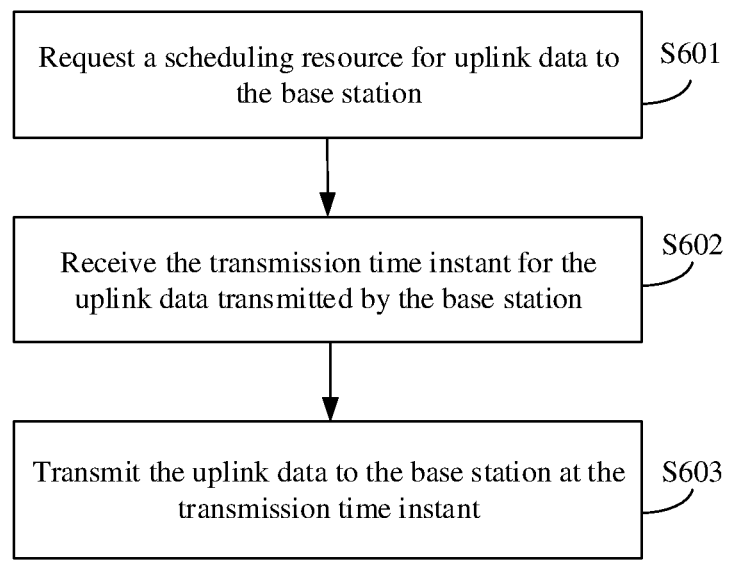
FIG. 6 is a flowchart illustrating yet another method for transmitting data in an unlicensed cell according to an example of the present application.

FIG. 6 is a flowchart illustrating yet another method for transmitting data in an unlicensed cell according to an example of the present application. As shown in FIG. 6, the method may further include steps S601-step S603.

At step S601, a scheduling resource for uplink data is requested to the base station, and the scheduling resource includes a transmission time instant.

After receiving the request for the scheduling resource for uplink data from the UE, the base station sets a conversion time interval between uplink data and downlink data, and determines a transmission time instant for uplink data according to the conversion time interval and the transmission time instant of the current downlink data.

At step S602, the transmission time instant for the uplink data transmitted by the base station is received.

At step S603, the uplink data is transmitted to the base station at the transmission time instant.

In the above embodiment, by requesting to the base station for a scheduling resource for uplink data, and receiving the transmission time instant for the uplink data transmitted by the base station, the uplink data can be transmitted to the base station at the transmission time instant for the uplink data.

Figure 7:
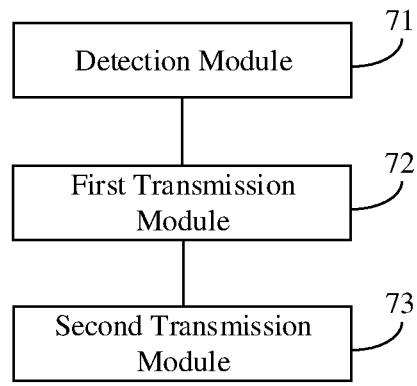
FIG. 7 is a block diagram illustrating a device for transmitting data in an unlicensed cell according to an example.

FIG. 7 is a block diagram illustrating a device for transmitting data in an unlicensed cell according to an example. The device may be located in a base station. As shown in FIG. 7, the device includes a detection module 71, a first transmission module 72 and a second transmission module 73.

The detection module 71 is configured to perform Listen before Talk (LBT) detection on a current channel.

The first transmission module 72 is configured to, when the detection module 71 detects that the current channel is idle, transmit first downlink data to user equipment (UE) using a current minimum scheduling resource.

In this embodiment, the base station first performs LBT detection before transmitting downlink data. If the base station detects that the current channel is idle, the base station transmits the first downlink data to the UE using a current minimum scheduling resource. The current minimum scheduling resource refers to the minimum possible subcarrier spacing (SCS) and the minimum time unit that is currently available, for example, one symbol.

The second transmission module 73 is configured to, when receiving feedback information indicating that the UE successfully receives the first downlink data transmitted by the first transmission module 72, increase the scheduling resource until the scheduling resource reaches a preset size, and transmit second downlink data to the UE using scheduling resource of the preset size, where the preset size refers to a maximum size of the scheduling resource that can be used when data is transmitted through the current channel.

If the feedback information indicating the UE successfully receives the first downlink data is received, it indicates that the current channel is still idle. Therefore, the scheduling resource can be increased, and the increased scheduling resource can be used to continue transmitting downlink data. If the current channel is always idle, the scheduling resource can be increased until reaching the maximum size of the scheduling resource that can be used when data is transmitted through the current channel, and the maximum size of the scheduling resource can be used to transmit downlink data. If feedback information indicating the UE has failed to receive the first downlink data is received, the LBT detection is performed on the current channel again, and the first downlink data is retransmitted when the current channel is idle.

It should be noted that the time length of LBT detection gradually increases as the number of times of LBT detection increases, but the maximum time length of LBT detection is less than or equal to a preset time length which is a time length normally used by the base station for LBT detection in data transmission. For example, the time length of the first LBT detection is shorter than the time length of the second LBT detection, the time length of the second LBT detection is shorter than the time length of the third LBT detection, and so on, but the time length of the last LBT detection is less than or equal to the preset time length.

In the above embodiment, when it is detected that the current channel is idle, the current minimum scheduling resource is used to transmit the first downlink data to the UE. If the feedback information indicating the UE successfully receives the first downlink data is received, the scheduling resource is increased, until reaching the preset size, and the scheduling resource of the preset size is used to transmit the second downlink data to the UE. That is, in the above embodiment, a smaller amount of downlink data is transmitted first, and then after the smaller amount of downlink data is successfully transmitted, a larger amount of downlink data is transmitted. Thus, when the beam direction of the interfering node is facing the base station, the amount of retransmitted data can be reduced, thereby reducing the delay in data transmission.

Figure 8:
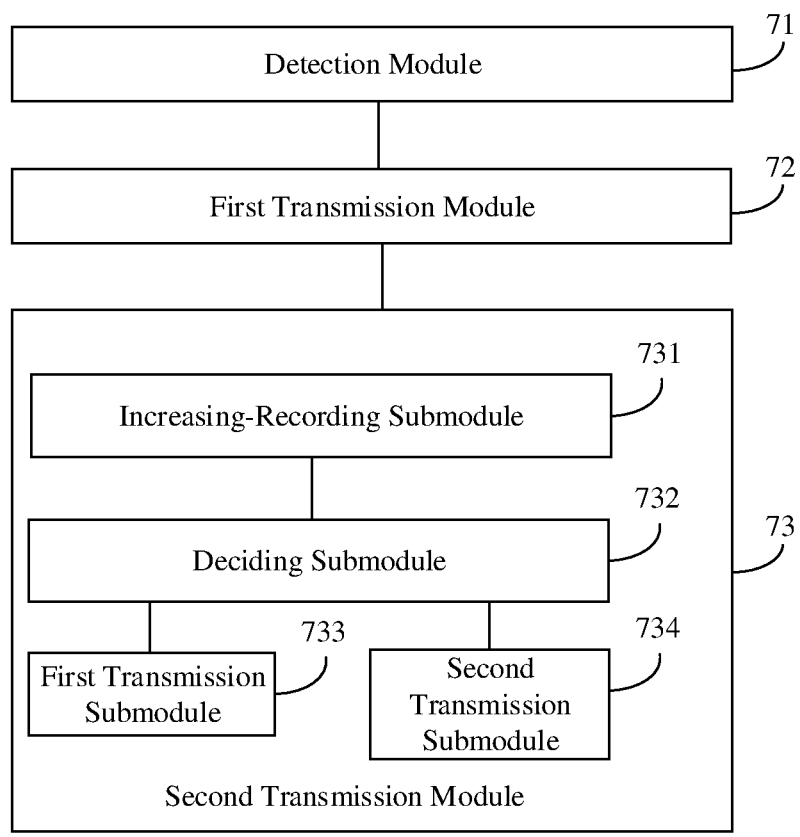
FIG. 8 is a block diagram illustrating another device for transmitting data in an unlicensed cell according to an example.

FIG. 8 is a block diagram illustrating another device for transmitting data in an unlicensed cell according to an example. As shown in FIG. 8, on the basis of the embodiment shown in FIG. 7, the second transmission module 73 may include an increasing-recording submodule 731, a deciding submodule 732, a first transmission submodule 733, and a second transmission submodule 734.

The increasing-recording submodule 731 is configured to increase the scheduling resource and record a total number of times of increasing the scheduling resource.

The deciding submodule 732 is configured to decide whether the current scheduling resource increased by the increasing-recording submodule reaches a preset size.

The first transmission submodule 733 is configured to, when the deciding submodule 732 decides that the current scheduling resource does not reach the preset size, transmit third downlink data to the UE using the current scheduling resource, and when the feedback information indicating the UE successfully receives the third downlink data is received, invoke the increasing-recording submodule to continue to perform the operation of increasing the scheduling resource.

The second transmission submodule 734 is configured to, when the deciding submodule 732 decides that the current scheduling resource reaches the preset size, transmit the second downlink data to the UE using the scheduling resource of the preset size.

In the above embodiment, by gradually increasing the scheduling resource, the objective of gradually increasing the amount of data transmitted can be achieved. Thus, when the beam direction of the interfering node is facing the base station, the amount of retransmitted data can be reduced, thereby reducing the delay in data transmission.

Figure 9:
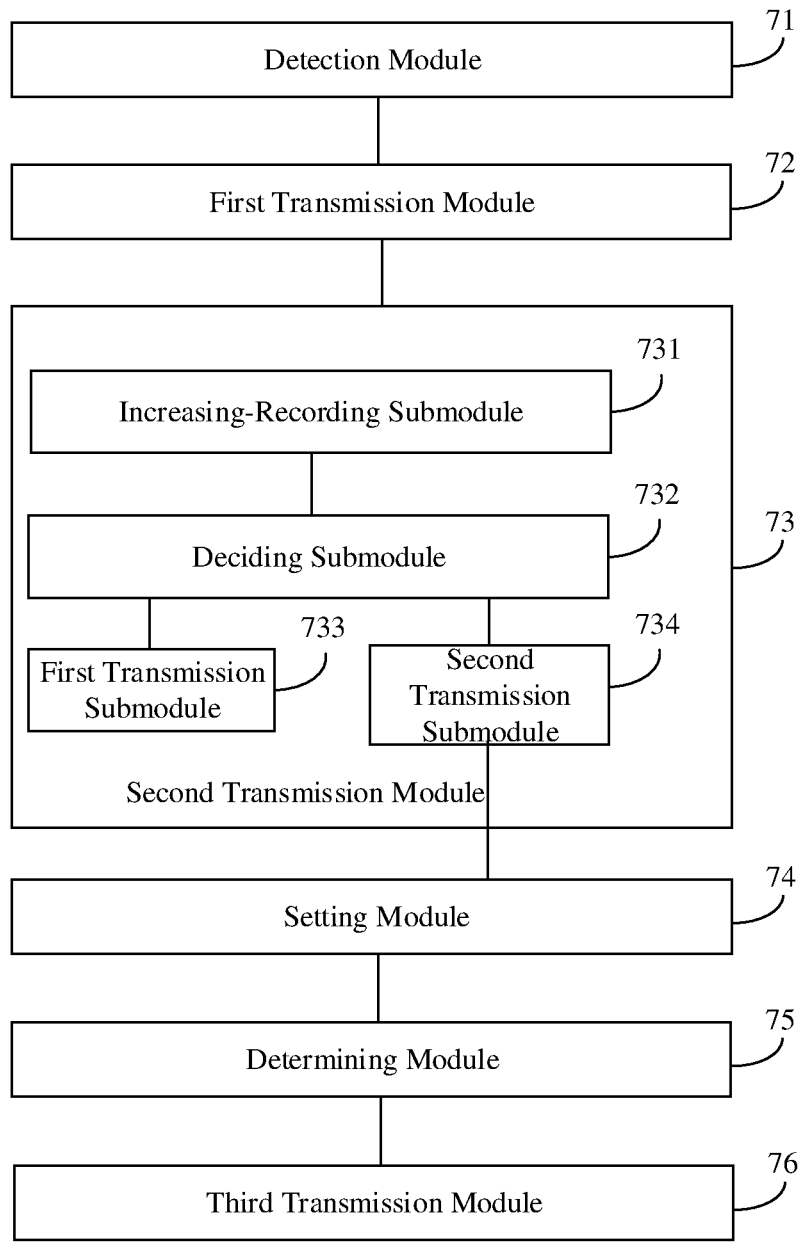
FIG. 9 is a block diagram illustrating another device for transmitting data in an unlicensed cell according to an example.

FIG. 9 is a block diagram illustrating another device for transmitting data in an unlicensed cell according to an example. As shown in FIG. 9, based on the embodiment shown in FIG. 8, the device may also include a setting module 74, a determining module 75, and a third transmission module 76.

The setting module 74 is configured to, before the second transmission submodule 734 transmits the second downlink data to the UE using the scheduling resource of the preset size, set a conversion time interval between uplink data and downlink data when receiving a request for a scheduling resource for uplink data from the UE, where the conversion time interval is related to the total number of times of increasing the scheduling resource and is less than a preset value.

Before the base station normally transmits downlink data, the conversion time interval between uplink and downlink data is not required to be continuous, but it is required to be less than a preset value, for example, 16 us. The specific conversion time interval t depends on the algorithm of the base station, and is related to the total number n of times of increasing the scheduling resource, for example, $t=T/n$, where T is 16 us at most.

The determining module 75 is configured to determine a transmission time instant for the uplink data according to the conversion time interval set by the setting module 74 and a transmission time instant for the current downlink data.

After setting the conversion time interval, the transmission time instant for the uplink data can be determined according to the conversion time interval and the transmission time instant for the current downlink data.

The third transmission module 76 is configured to transmit the transmission time instant for uplink data determined by the determining module 75 to the UE.

In the above embodiment, the conversion time interval between the uplink data and the downlink data may be set, and according to the conversion time interval and the transmission time instant for the current downlink data, the transmission time instant for the uplink data can be determined, so that the UE can transmit the uplink data to the base station at the transmission time instant for the uplink data.

Figure 10:
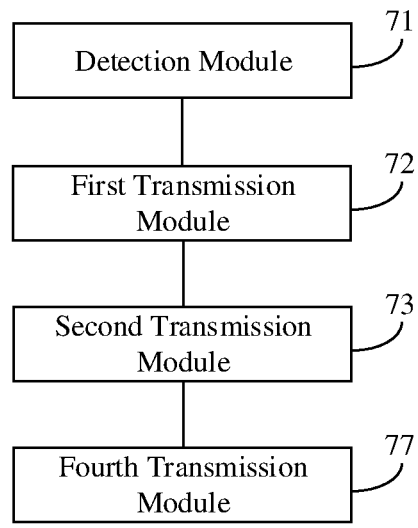
FIG. 10 is a block diagram illustrating another device for transmitting data in an unlicensed cell according to an example.

FIG. 10 is a block diagram illustrating another device for transmitting data in an unlicensed cell according to an example. As shown in FIG. 10, based on the embodiment shown in FIG. 7, the device may also include a fourth transmission module 77.

The fourth transmission module 77 is configured to transmit scheduling information to the UE. The scheduling information is used to indicate that the base station transmits downlink data in an ascending order of data size and indicate the size of the downlink data transmitted each time. The downlink data includes the first downlink data, the second downlink data and the third downlink data.

In this embodiment, after determining the size of the downlink data to be transmitted each time, the base station transmits scheduling information to the UE to inform the UE that the base station transmits the downlink data in an ascending order of data size and inform the size of the downlink data transmitted each time. This allows the UE to enable a buffer area of a corresponding size according to the size of the downlink data to be transmitted.

In the above embodiment, by transmitting scheduling information to the UE, the UE can enable a buffer area of a corresponding size according to the size of the downlink data to be transmitted, thereby achieving the objective of reducing buffering overhead.

Figure 11:
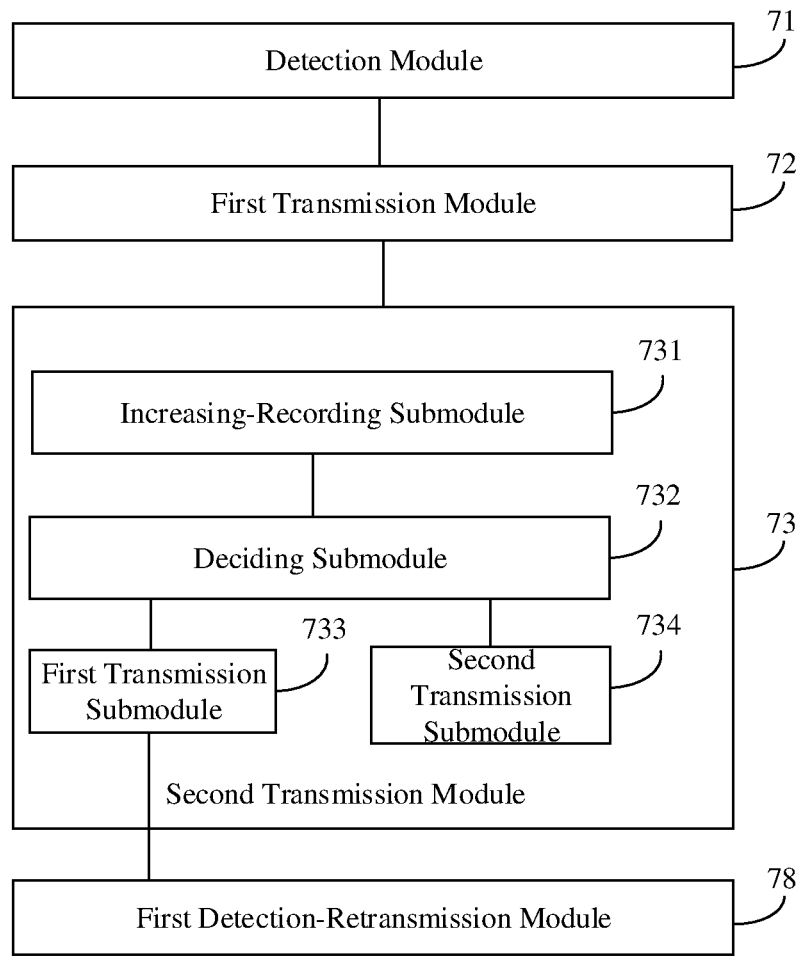
FIG. 11 is a block diagram illustrating another device for transmitting data in an unlicensed cell according to an example.

FIG. 11 is a block diagram illustrating another device for transmitting data in an unlicensed cell according to an example. As shown in FIG. 11, based on the embodiment shown in FIG. 8, the device may also include a first detection-retransmission module 78.

The first detection-retransmission module 78 is configured to perform LBT detection on the current channel when receiving feedback information indicating the UE has failed to receive the third downlink data, and retransmit the third downlink data when the current channel is idle.

If the transmission of the third downlink data fails, it is necessary to perform LBT detection on the current channel again, and retransmit the third downlink data when the current channel is idle.

In the above embodiment, when feedback information indicating the UE has failed to receive the third downlink data is received, LBT detection is performed on the current channel, and the third downlink data is retransmitted when the current channel is idle, so as to realize data transmission.

Figure 12:
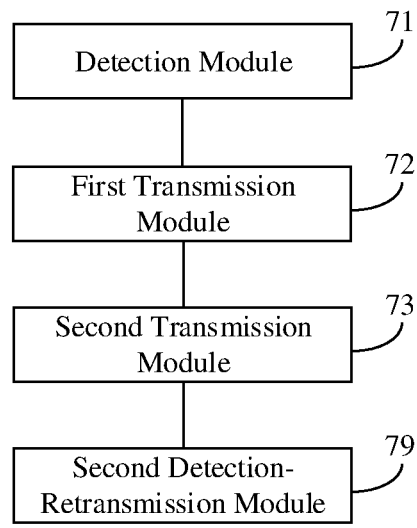
FIG. 12 is a block diagram illustrating another device for transmitting data in an unlicensed cell according to an example.

FIG. 12 is a block diagram illustrating another device for transmitting data in an unlicensed cell according to an example. As shown in FIG. 12, based on the embodiment shown in FIG. 7, the device may also include a second detection-retransmission module 79.

The second detection-retransmission module 79 is configured to perform LBT detection on the current channel when receiving feedback information indicating the UE has failed to receive the first downlink data, and retransmit the first downlink data when the current channel is idle.

If the transmission of the first downlink data fails, it is necessary to perform LBT detection on the current channel again, and retransmit the first downlink data when the current channel is idle.

In the above embodiment, when feedback information indicating the UE has failed to receive the first downlink data is received, LBT detection is performed on the current channel, and the first downlink data is retransmitted when the current channel is idle, so as to achieve data transmission.

Figure 13:
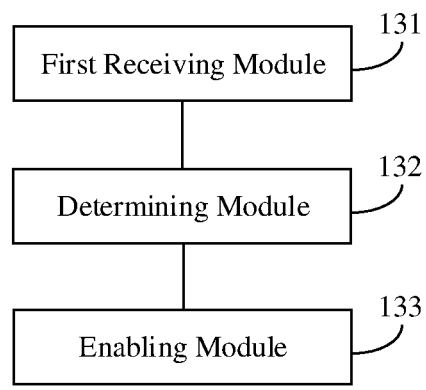
FIG. 13 is a block diagram illustrating yet another device for transmitting data in an unlicensed cell according to an example.

FIG. 13 is a block diagram illustrating another device for transmitting data in an unlicensed cell according to an example. The device may be located in UE. As shown in FIG. 13, the device includes a first receiving module 131, a determining module 132 and an enabling module 133.

The first receiving module 131 is configured to receive scheduling information transmitted by the base station.

The determining module 132 is configured to: determine, according to the scheduling information received by the first receiving module 131, that the base station transmits downlink data in an ascending order of data size, and a size of downlink data transmitted each time.

The enabling module 133 is configured to enable a buffer area of a corresponding size according to the size of the downlink data currently to be received which is determined by the first receiving module 132.

If the downlink data currently to be received is the first downlink data, the enabled buffer area is a first buffer area, and the size of the first buffer area is less than the preset threshold. If the downlink data currently to be received is the second downlink data, the enabled buffer area is the second buffer area, and the size of the second buffer area is equal to the preset threshold. If the downlink data currently to be received is the third downlink data, the enabled buffer area is the third buffer area, the size of the third buffer area is smaller than the preset threshold, and the third buffer area is larger than the first buffer area.

In the above embodiment, the scheduling information transmitted by the base station may be received, and according to the scheduling information, it can be determined that the base station transmits downlink data in an ascending order of data size and the size of downlink data transmitted each time can be determined. According to the size of downlink data currently to be received, the buffer area of the corresponding size is enabled, so as to achieve the objective of reducing the buffer overhead.

Figure 14:
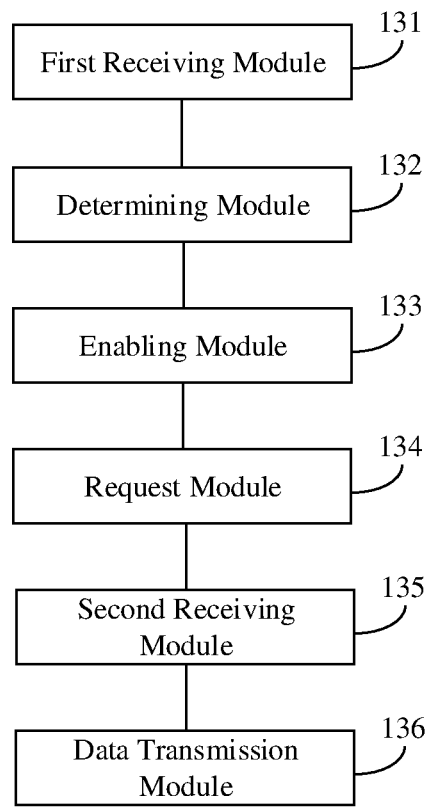
FIG. 14 is a block diagram illustrating still another device for transmitting data in an unlicensed cell according to an example.

FIG. 14 is a block diagram illustrating another device for transmitting data in an unlicensed cell according to an example. As shown in FIG. 14, on the basis of the embodiment shown in FIG. 13, the device may also include a request module 134, a second receiving module 135, and a data transmission module 136.

The request module 134 is configured to request a scheduling resource for uplink data to the base station, and the scheduling resource includes a transmission time instant.

After receiving the request for the scheduling resource for uplink data from the UE, the base station sets a conversion time interval between uplink data and downlink data, and determines a transmission time instant for uplink data according to the conversion time interval and the transmission time instant of the current downlink data.

The second receiving module 135 is configured to receive the transmission time instant for the uplink data transmitted by the base station according to the scheduling resource requested by the request module 134.

The data transmission module 136 is configured to transmit the uplink data to the base station at the transmission time instant received by the second receiving module 135.

In the above embodiment, by requesting the base station for a scheduling resource for uplink data, and receiving the transmission time instant for the uplink data transmitted by the base station, the uplink data can be transmitted to the base station at the transmission time instant for the uplink data.

Figure 15:
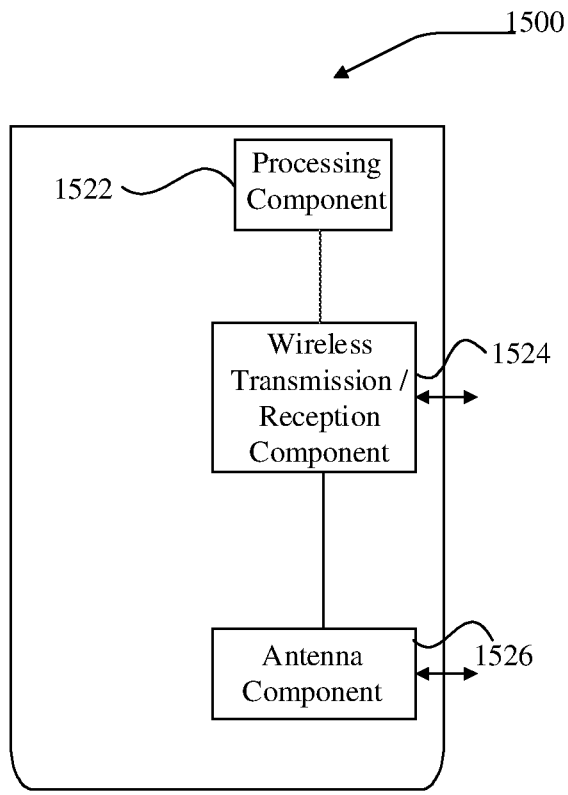
FIG. 15 is a block diagram illustrating a device applied to data transmission in an unlicensed cell according to an example.

FIG. 15 is a block diagram illustrating another device for transmitting data in an unlicensed cell according to an example. The device 1500 can be a base station. Referring to FIG. 15, the device 1500 includes a processing component 1522, a wireless transmission/reception component 1524, an antenna component 1526, and a signal processing part specific to the wireless interface. The processing component 1522 may further include one or more processors.

One of the processors of the processing component 1522 can be configured to:

perform Listen before Talk (LBT) detection on a current channel;

if it is detected that the current channel is idle, transmit first downlink data to user equipment (UE) using a current minimum scheduling resource; and if feedback information indicating the UE successfully receives the first downlink data is received, increase the scheduling resource until the scheduling resource reaches a preset size, and transmit second downlink data to the UE using scheduling resource of the preset size, where the preset size refers to a maximum size of the scheduling resource that can be used when data is transmitted through the current channel.

In an example, a non-transitory computer-readable storage medium including instructions is provided, and the instructions can be executed by the processing component 1522 of the device 1500 to complete the method for transmitting data in an unlicensed cell. For example, the non-transitory computer-readable storage medium can be a ROM, a random access memory (RAM), a CD-ROM, a magnetic tape, a floppy disk, an optical data storage device, or the like.

Figure 16:
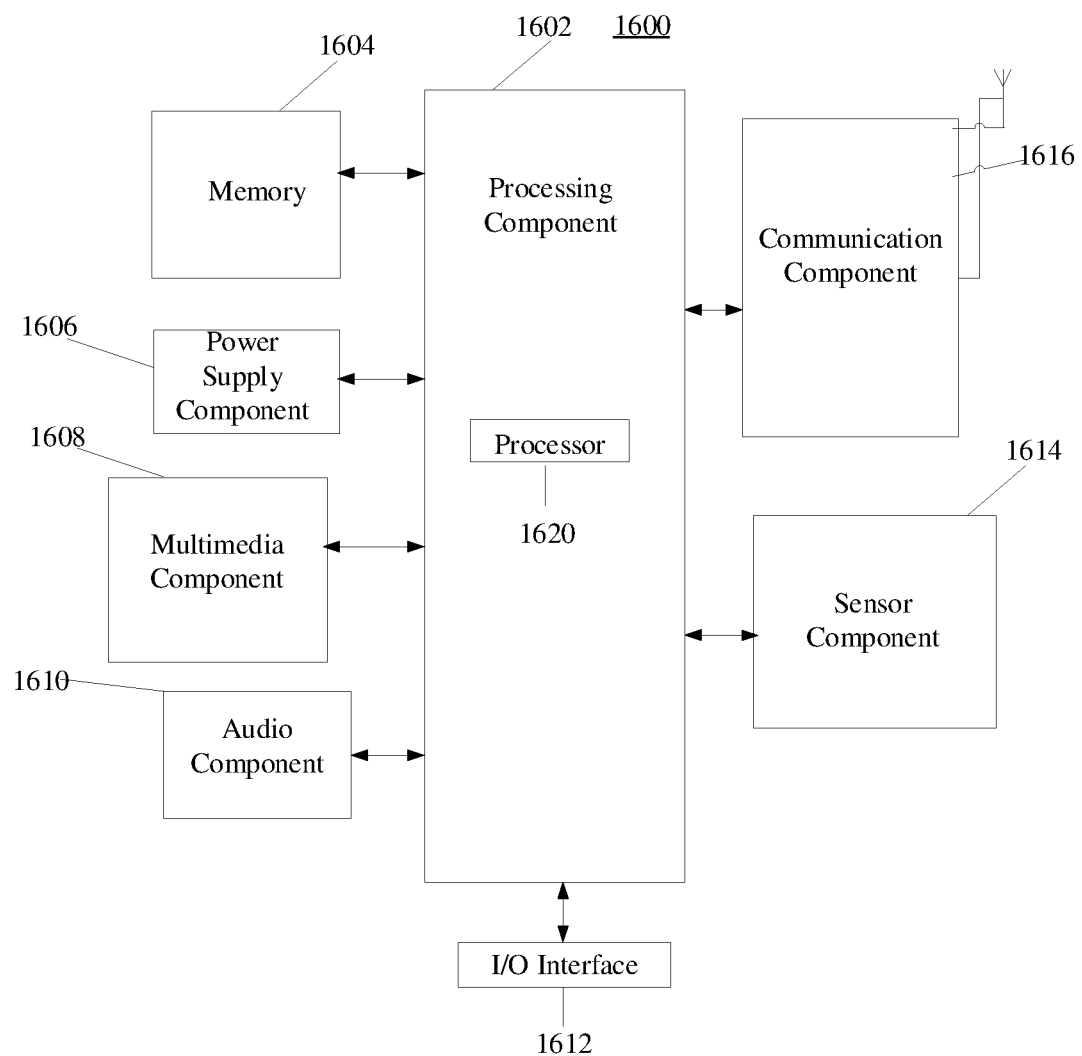
FIG. 16 is a block diagram illustrating another device applied to data transmission in an unlicensed cell according to an example.

FIG. 16 is a block diagram illustrating another device for transmitting data in an unlicensed cell according to an example. For example, the device 1600 can be user equipment such as a mobile phone, a computer, a digital broadcasting terminal, a messaging device, a game console, a tablet device, a medical device, fitness equipment, a personal digital assistant, or the like.

As shown in FIG. 16, the device 1600 can include one or more of the following components: a processing component 1602, a memory 1604, a power supply component 1606, a multimedia component 1608, an audio component 1610, an input/output (I/O) interface 1612, a sensor component 1614, and a communication component 1616.

The processing component 1602 generally controls overall operations of the device 1600, such as operations associated with display, phone calls, data communications, camera operations, and recording operations. The processing component 1602 can include one or more processors 1620 to execute instructions to complete all or part of the steps of the above methods. In addition, the processing component 1602 can include one or more modules which facilitate the interaction between the processing component 1602 and other components. For example, the processing component 1602 can include a multimedia module to facilitate the interaction between the multimedia component 1608 and the processing component 1602.

One of the processors 1620 in the processing component 1602 can be configured to:

receive scheduling information transmitted by the base station;

determine, according to the scheduling information, that the base station transmits downlink data in an ascending order of data size, and a size of downlink data transmitted each time; and enable a buffer area of a corresponding size according to the size of the downlink data currently to be received.

The memory 1604 is configured to store various types of data to support the operation of the device 1600. Examples of such data include instructions for any application or method operated on the device 1600, contact data, phonebook data, messages, pictures, videos, and so on. The memory 1604 can be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1606 supplies power for different components of the device 1600. The power supply component 1606 can include a power supply management system, one or more power supplies, and other components associated with generating, managing and distributing power for the device 1600.

The multimedia component 1608 includes a screen providing an output interface between the device 1600 and a user. In some examples, the screen can include a Liquid Crystal Display (LCD) and a Touch Panel (TP). If the screen includes the TP, the screen can be implemented as a touch screen to receive input signals from the user. The TP can include one or more touch sensors to sense touches, swipes, and gestures on the TP. The touch sensors can not only sense a boundary of a touch or swipe, but also sense a duration and a pressure associated with the touch or swipe. In some examples, the multimedia component 1608 can include a front camera and/or a rear camera. The front camera and/or rear camera can receive external multimedia data when the device 1600 is in an operating mode, such as a photographing mode or a video mode. Each of the front camera and the rear camera can be a fixed optical lens system or have focal length and optical zooming capability.

The audio component 1616 is configured to output and/or input an audio signal. For example, the audio component 1616 includes a microphone (MIC). When the device 1600 is in an operating mode, such as a call mode, a record mode and a voice recognition mode, the microphone is configured to receive an external audio signal. The received audio signal can be further stored in the memory 1604 or sent via the communication component 1616. In some examples, the audio component 1616 further includes a speaker for outputting an audio signal.

The I/O interface 1612 provides an interface between the processing component 1602 and a peripheral interface module. The above peripheral interface module can be a keyboard, a click wheel, buttons, or the like. These buttons can include but not limited to, a home button, a volume button, a start button and a lock button.

The sensor component 1614 includes one or more sensors configured to provide status assessments of various aspects for the device 1600. For example, the sensor component 1614 can detect the on/off status of the device 1600, and relative positioning of components, for example, the components are a display and a keypad of the device 1600. The sensor component 1614 can also detect a change in position of the device 1600 or a component of the device 1600, a presence or absence of the contact between a user and the device 1600, an orientation or an acceleration/deceleration of the device 1600, and a change in temperature of the device 1600. The sensor component 1614 can include a proximity sensor configured to detect the presence of a nearby object without any physical contact. The sensor component 1614 can further include an optical sensor, such as a Complementary Metal-Oxide-Semiconductor (CMOS) or Charged Coupled Device (CCD) image sensor which is used in imaging applications. In some examples, the sensor component 1614 can further include an acceleration sensor, a gyroscope sensor, a magnetic sensor, a pressure sensor, or a temperature sensor.

The communication component 1616 is configured to facilitate wired or wireless communication between the device 1600 and other devices. The device 1600 can access a wireless network based on a communication standard, such as Wi-Fi, 2G or 3G, or a combination thereof. In an example, the communication component 1616 receives a broadcast signal or broadcast related information from an external broadcast management system via a broadcast channel In an example, the communication component 1616 can further include a Near Field Communication (NFC) module for promoting short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In an example, the device 1600 can be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, a non-transitory computer readable storage medium including instructions is further provided, such as the memory 1604 including instructions. The above instructions can be executed by the processor 1620 of the device 1600 to complete the photosensitive control method. For example, the non-transitory computer readable storage medium can be a Read-Only Memory (ROM), a Random Access Memory (RAM), a CD-ROM, a magnetic tape, a floppy disk, an optical data storage device, and so on.

Since the device embodiments substantially correspond to the method embodiments, a reference may be made to part of the descriptions of the method embodiments for the related part. The device embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

What is claimed is:

1. A method for transmitting data in an unlicensed cell, applied to a base station, the method comprising:
    performing Listen before Talk (LBT) detection on a current channel;
    in response to detecting that the current channel is idle, transmitting first downlink data to user equipment (UE) using a current minimum scheduling resource; and in response to receiving feedback information indicating the UE successfully receives the first downlink data, increasing the scheduling resource until the scheduling resource reaches a preset size, and transmitting second downlink data to the UE using the scheduling resource of the preset size, wherein the preset size is a maximum size of the scheduling resource that can be used when the second downlink data is transmitted through the current channel.

2. The method according to claim 1, wherein increasing the scheduling resource until the scheduling resource reaches a preset size and transmitting second downlink data to the UE using the scheduling resource of the preset size comprises:
increasing the scheduling resource and recording a total number of times of increasing the scheduling resource;
deciding whether a current scheduling resource reaches the preset size;
in response to deciding that the current scheduling resource does not reach the preset size, transmitting third downlink data to the UE using the current scheduling resource; and
in response to deciding that the current scheduling resource reaches the preset size, transmitting the second downlink data to the UE using the scheduling resource of the preset size.

3. The method according to claim 2, further comprising:
before transmitting the second downlink data to the UE using the scheduling resource of the preset size,
in response to receiving a request for the scheduling resource for uplink data from the UE, setting a conversion time interval between the uplink data and the downlink data, wherein the conversion time interval is related to the total number of times of increasing the scheduling resource and is less than a preset value;
determining a transmission time instant for the uplink data according to the conversion time interval and a transmission time instant for current downlink data; and
transmitting the transmission time instant for the uplink data to the UE.

4. The method according to claim 1, further comprising:
transmitting scheduling information to the UE, wherein the scheduling information is configured to indicate that the base station transmits downlink data in an ascending order of data size and indicate a size of downlink data transmitted each time, and the downlink data includes the first downlink data, the second downlink data, and third downlink data.

5. The method according to claim 2, further comprising:
performing LBT detection on the current channel in response to receiving feedback information indicating the UE has failed to receive the third downlink data, and retransmitting the third downlink data when the current channel is idle.

6. The method according to claim 1, further comprising:
performing LBT detection on the current channel in response to receiving feedback information indicating the UE has failed to receive the first downlink data, and retransmitting the first downlink data when the current channel is idle.

7. The method according to claim 1, wherein a time length of the LBT detection gradually increases with increase of a number of LBT detections, and a maximum time length of the LBT detection is less than or equal to a preset time length normally used by the base station for LBT detection in data transmission.

8. A method for transmitting data in an unlicensed cell, applied to user equipment (UE), the method comprising:
receiving scheduling information transmitted by a base station using the method according to claim 4;
determining, according to the scheduling information, that the base station transmits downlink data in an ascending order of data size, and a size of downlink data transmitted each time; and
enabling a buffer area of a corresponding size according to the size of the downlink data currently to be received.

9. The method according to claim 8, wherein if the downlink data currently to be received is first downlink data, the enabled buffer area is a first buffer area, and a size of the first buffer area is smaller than a preset threshold;
if the downlink data currently to be received is second downlink data, the enabled buffer area is a second buffer area, and a size of the second buffer area is equal to the preset threshold; or
if the downlink data currently to be received is third downlink data, the enabled buffer area is a second buffer area, a size of the third buffer area is smaller than the preset threshold and the third buffer area is larger than the first buffer area.

10. The method according to claim 8, further comprising:
requesting a scheduling resource for uplink data to the base station, wherein the scheduling resource includes a transmission time instant;
receiving the transmission time instant for the uplink data transmitted by the base station; and
transmitting the uplink data to the base station at the transmission time instant.

11. A base station, comprising:
a processor; and
a memory for storing processor-executable instructions;
wherein the processor is configured to:
perform Listen before Talk (LBT) detection on a current channel;
in response to detecting that the current channel is idle, transmit first downlink data to user equipment (UE) using a current minimum scheduling resource; and
in response to receiving feedback information indicating the UE successfully receives the first downlink data, increase the scheduling resource until the scheduling resource reaches a preset size, and transmit second downlink data to the UE using the scheduling resource of the preset size, wherein the preset size is a maximum size of the scheduling resource that can be used when the second downlink data is transmitted through the current channel.

12. User equipment, comprising:
a processor; and
a memory for storing processor-executable instructions;
wherein the processor is configured to:
receive scheduling information transmitted by the base station according to claim 11;
determine, according to the scheduling information, that the base station transmits downlink data in an ascending order of data size, and a size of downlink data transmitted each time; and
enable a buffer area of a corresponding size according to the size of the downlink data currently to be received.

13. The base station according to claim 11, wherein in increasing the scheduling resource until the scheduling resource reaches a preset size and transmitting second downlink data to the UE using the scheduling resource of the preset size, the processor is further configured to:
- increase the scheduling resource and recording a total number of times of increasing the scheduling resource;
- decide whether a current scheduling resource reaches the preset size;
- in response to deciding that the current scheduling resource does not reach the preset size, transmit third downlink data to the UE using the current scheduling resource; and
- in response to deciding that the current scheduling resource reaches the preset size, transmit the second downlink data to the UE using the scheduling resource of the preset size.

14. The base station according to claim 13, wherein the processor is further configured to:
- before transmitting the second downlink data to the UE using the scheduling resource of the preset size,
- in response to receiving a request for the scheduling resource for uplink data from the UE, set a conversion time interval between the uplink data and the downlink data, wherein the conversion time interval is related to the total number of times of increasing the scheduling resource and is less than a preset value;
- determine a transmission time instant for the uplink data according to the conversion time interval and a transmission time instant for current downlink data; and
- transmit the transmission time instant for the uplink data to the UE.

15. The base station according to claim 11, wherein the processor is further configured to:
- transmit scheduling information to the UE, wherein the scheduling information is configured to indicate that the base station transmits downlink data in an ascending order of data size and indicate a size of downlink data transmitted each time, and the downlink data includes the first downlink data, the second downlink data, and third downlink data.

16. The base station according to claim 13, wherein the processor is further configured to:
- perform LBT detection on the current channel in response to receiving feedback information indicating the UE has failed to receive the third downlink data, and retransmit the third downlink data when the current channel is idle.

17. The base station according to claim 11, wherein the processor is further configured to:
- perform LBT detection on the current channel in response to receiving feedback information indicating the UE has failed to receive the first downlink data, and retransmit the first downlink data when the current channel is idle.

18. The base station according to claim 11, wherein a time length of the LBT detection gradually increases with increase of a number of LBT detections, and a maximum time length of the LBT detection is less than or equal to a preset time length normally used by the base station for LBT detection in data transmission.

* * * * *